July 20, 1965 A. M. CUMMINGS 3,195,567
VALVE STRUCTURE AS FOR APPLYING BRAKING FLUID TO TRAILER
BRAKES IN ADVANCE OF PRIME MOVER BRAKES
Filed April 9, 1962 2 Sheets-Sheet 2
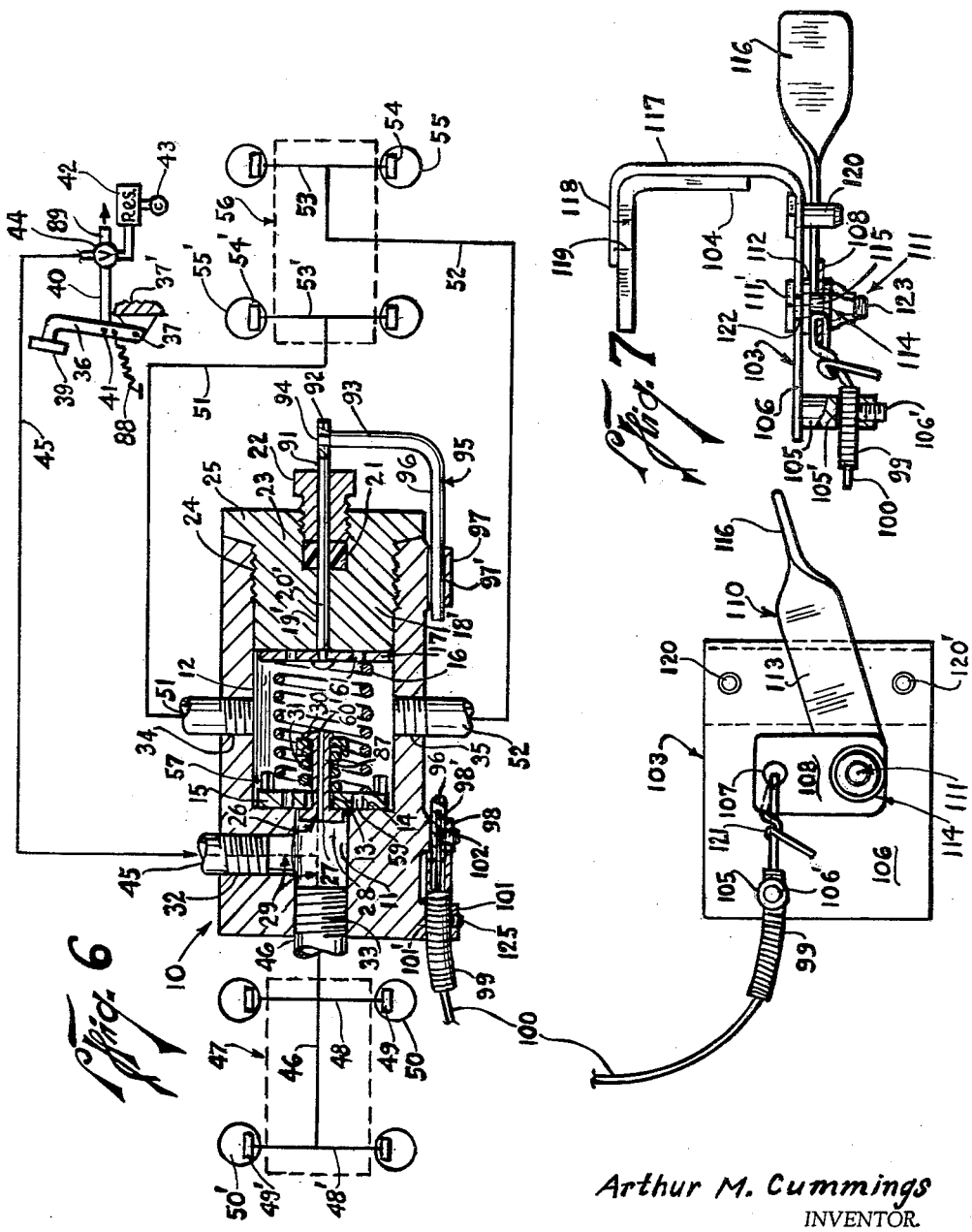
Arthur M. Cummings
INVENTOR.
BY Wm. E. Ford
ATTORNEY

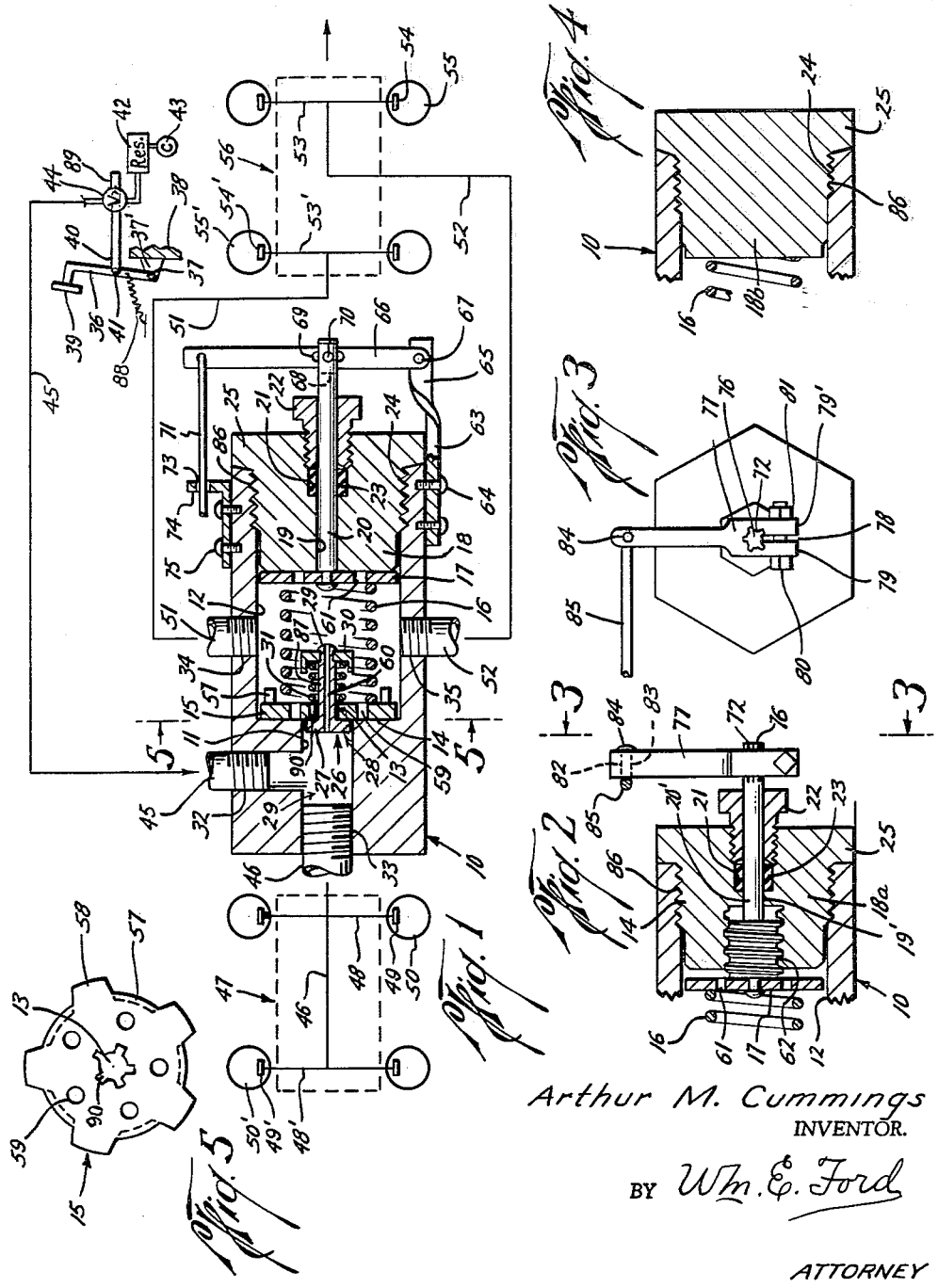

United States Patent Office 3,195,567
Patented July 20, 1965

3,195,567
VALVE STRUCTURE AS FOR APPLYING BRAKING FLUID TO TRAILER BRAKES IN ADVANCE OF PRIME MOVER BRAKES
Arthur M. Cummings, 2325 Deutser St., Houston, Tex.
Filed Apr. 9, 1962, Ser. No. 186,268
7 Claims. (Cl. 137—493.4)

This invention relates to a valve structure which diverts fluid from a source to different channels at different times to carry out operations sequentially, and the invention can have particular application to a braking system whereby fluid from a source of compressed air is set in motion, upon the application of prime mover brakes, to flow to such valve structure and therefrom to apply trailer brakes in advance of applying the prime mover brakes, the application herein setting forth the invention being a continuation-in-part application of co-pending application Serial No. 754,367, filed August 11, 1958, now abandoned, for Valve Structure as for Applying Braking Fluid to Trailer Brakes in Advance of Prime Mover Brakes.

As its primary object this invention therefore provides a valve structure for employment with a fluid system to divert fluid from a source thereof to effectuate its work at one location in advance of effectuating its work at another location.

It is also a particular object of this invention to provide a valve structure in the braking system of a prime mover which pulls a trailer or the like so that when the source of braking fluid is pressurized the valve structure controls the fluid to direct it to the trailer brakes in advance of directing it to the prime mover brakes.

It is another object of this invention to provide a valve structure of this type which, in operation in a braking system, accelerates the equalization of pressures in the trailer brake and prime mover brake systems in addition to the degree of equalization accomplished by the opening of the main valve therebetween, and which also accelerates the equalization of pressures in such brake systems in addition to the degree of equalization accomplished by the seating of the main valve therebetween.

It is still another object of this invention to provide a valve structure of this type which includes means to vary the pressure differential which must be accomplished between trailer brake and prime mover brake systems in order to unseat the main valve thereinbetween.

It is also an important object of the invention to provide a means of varying the pressure differential, as aforesaid, which means is readily accessible to the operator and is accurate in response to manipulation from a point spaced from the valve.

It is also a further object of this invention to provide a valve structure of this type which operates in a fluid system closed to the atmosphere.

It is yet another object of this invention to provide a valve structure of this type having a minimum engagement of frictional surfaces.

Other and further objects of this invention will be apparent when the specification herein is considered in connection with the drawings in which:

FIG. 1 is a sectional view, partially diagrammatic, showing an embodiment of the invention;

FIG. 2 is a fragmentary sectional view showing a modification of the pressure differential adjustment means shown in FIG. 1;

FIG. 3 is a view taken along line 3—3 of FIG. 2;

FIG. 4 is a fragmentary sectional view showing another modification of the invention with no special means provided to adjust the pressure differential;

FIG. 5 is a sectional view taken along line 5—5 for FIG. 1 showing the valve element of the main valve;

FIG. 6 is a sectional view, partially diagrammatic, showing an embodiment of the invention; and FIG. 7 is a plan view taken along line 7—7 of FIG. 6, showing the adjustment bracket of the invention.

Referring in detail to the drawings in which like reference numerals are assigned to like elements in the various views, FIG. 1 shows a valve body 10 which can be of round or hexagonal metal stock, as steel or aluminum. Such body 10 has a bore 11 therein and a counterbore 12 to communicate therewith and forming a shoulder 14 on which may seat a valve element or plate 15 comprising part of a valve assembly 28, to be further described in detail. A first resilient means or spring 16 bears at one end upon the valve element or plate 15 and at its other end upon a plate or disc 17 which in turn bears upon the inner face of a closure plug or closure 18 which has a threaded portion 24 to threadedly engage threads 86 in the end of the body, the plug having a flange 25, preferably of hexagonal stock which bears upon and seals with the slightly countersunk or chamfered end face of the body when the plug or closure 18 is threaded full up into the body 10. A bore 19 is provided in the plug 18 and also a counterbore 21 which is threaded at its outer end.

A rod 20 extends through the counterbore 21 and the bore 20 has its inner end turned down to extend through a central bore in the plate 17 so that the rod shoulders against the plate, and the turned down end of the rod is peened over on the inner side of the plate 17 to effect firm connection between the plate and the rod. The counterbore 21 contains packing 23 inwardly of the outer, threaded portion thereof and a packing gland 22 is threaded thereinto to bear upon the packing to prevent leakage.

The outer end of the rod 20 has a slot 68 therein and a lever 66 of bar stock of thickness to fit within the slot 68 is provided, such lever being pivotally connected at 67 to a post or support 63, also of bar stock which has its outer, pivot mounting end 65 twisted 90 degrees from the part which rests against the body 10 and against a side of the plug flange 25, and which is mounted upon the body by screws 64.

A slot 69 is provided in the lever 66 and a pin 70 extends through the rod 20 and across the slot 68 therein and through the slot 69 to effect lost motion engagement between the rod 20 and the lever 66. A wire rod 71 is connected to the end of the lever 66 opposite its pivoted end and such rod extends through a guide opening 73 in a guide bracket 74 mounted on the valve body 10 by screws 75. Thus when the wire rod 71 is pulled in direction opposite the plugged end of the body, the rod 20 urges the plate 17 to compress the first resilient means or spring 16 to increase the tension with which the spring will bear upon the valve element or plate 15 to urge it against the shoulder 14, there being openings 61 provide in the plate 17 to alleviate any tendency of the plate to pull vacuum as it moves away from the inner face of the plug or closure.

In detail the valve element or plate 15 may be fabricated to star shaped outer periphery, as shown in FIG. 5, to provide guide arms 58 to guide the valve element within the counterbore 12, the metal between arms being turned 90 degrees to provide guide lugs 57 to retain the spring 16 in desired position. Such valve element or plate 15 has a central opening or aperture 13 therethrough and openings 59 therethrough outwardly of the central bore or aperture 13 for a purpose to be hereinbelow described.

A valve assembly 28, which includes the valve element or plate 15, also includes a valve or valve means 26 having a flanged head or flange 27 in the bore 11 and a shank or stem 87 which extends from the flange 27 with slight clearance through the central opening or aperture 13 in the valve element or plate 15 as the flange 27 bears upon the surface of the valve element or plate 15 surrounding such central opening or aperture 13. The end of the shank or stem 87 is turned down and a cup element or transverse member 30 having a central bore therethrough is fitted upon such turned down end which extends through the central bore of the cup and is peened over to effectively connect the cup or transverse member 30 and the valve 26 so that the cup guideably retains a second resilient means or spring 31 which bears against the valve element or plate 15 and urges the cup 30 in direction such that the valve flange 27 bears firmly against the valve element or plate 15, aforesaid.

In summary it may be seen that the valve assembly 28 includes the valve plate 15, a valve means 26 includes a flange 27 and a stem 87 extending therefrom through the plate 15 into the counterbore 12 to terminate in a transverse member 30 which provides the bearing surface for one end of the spring which extends around the stem 87 and bears at its other end against the valve plate 15 which seats against the shoulder 14 and is urged seated by a spring or resilient means 16 of larger diameter and greater strength or tension than the spring 31, the outer end of the spring 16 bearing against the plate 17, not included as part of the valve assembly 28, but which is adjustably movable to change the tension of the spring 16.

The valve structure 10, as hereinabove described, is assembled on a prime mover such as a tractor, preferably so that the adjustment wire 71 may be easily accessible to the drive or operator. As shown in FIG. 1 a source of compressed air in the form of a compressor 43 is supplied into a reservoir 42 which is connected with a conventional application of metering valve 44 from which extends the conduct 45 forming part of a channel 29. The conduit 45 connects into the threaded bore 32 in the valve body 10 also included by the channel 29 which additionally includes the bore 11 and a conduit 46 and branch lines therefrom to the brakes of the trailer wheels, as will be hereinbelow described. The metering valve 44 is controlled by a plunger 40 which is pivotally connected at 41 to a brake lever 36 which in turn is pivotally connected at 37 to a bracket 37' fixed to the prime mover frame 38. Thus when the brake pedal 39 is pressed the plunger 40 opens the application valve 44 to pass air from the reservoir 42 into the conduit 45 of the channel 29 to pass therethrough to the valve body 10 to operate as will be described hereinbelow. On the other hand, when the pressure is removed from the brake pedal 39, the spring 88 urges the lever 36 to move the plunger 40 to close the application valve 44 from supplying compressed air from the reservoir 42 and the compressed air from the system bleeds back through the conduit 45 to the application valve 44, and outwardly therefrom through a discharge 89 to the atmosphere, as is the customary functioning of application valves in such usages.

The aforesaid conduit 46 is threadably connected into the threaded end 33 of the bore 11 and such conduit extends to a drawn vehicle 47, such as a trailer, where branches 48 extend therefrom to the brakes 49 of the front wheels 50, and branches 48' extend therefrom to the blades 49' of the rear wheels 50', such brakes being the conventional type of fluid actuated brakes, as those actuated pneumatically.

A third conduit 51 is connected at one end into a threaded bore 34 through the wall of the body 10 to communicate with the counterbore 12, and such conduit 51 extends to communicate with branches 53' which extend to the brake 54' of the rear wheels 55' of the prime mover or tractor 56. Also a fourth conduit 52 is connected at one end into a second threaded bore 35 through the wall of the body 10 to communicate with the counterbore 12, the conduit 52 extending to communicate with branches 53 which extend to the brakes 54 of the rear wheels 55 of the prime mover or tractor 56.

As shown in FIGS. 2 and 3, a modification of the invention is shown having a different means of adjusting the tension of the spring 16 which urges the valve element of plate 15 seated. In this form of the invention the plate 17 is connected to shoulder upon the inner face of a screw member 62 forming part of an adjustment rod 20', such screw having large size thread with ample pitch thereon engageable with an inner counterbore into the plug or closure 18a, the rod 20' extending outwardly from the screw member 62 through the bore 19' and through an outer counterbore 21 which provides the stuffing box for the packing 23 and which threadably receives the packaging gland 22 therein, the rod 19' extending outwardly through the packaging 23 and through a stuffing gland 22 which is threadable into the outer end of the counterbore 21 to compress the packaging 23 about the rod 20'.

Outwardly of the gland 22 the end of the rod 20' has grooves 76 milled therein to form splines 72 to fit into a correspondingly splined and grooved handle 77 which has a slot 78 milled therein to divide the handle into two bifurcated prongs 79, 79' which are drilled through to receive a bolt 80 therethrough so that when a nut 81 is threaded upon the end of the bolt 80, and tightened thereon, the handle 77 is firmly connected to the rod 20'. The end of the handle has a bore 82 therethrough to receive the end 83 of a rod 85, such end being turned at 90 degrees to the rod 85 and peened over at 84 whereby the rod is firmly pivotally connected to the handle 77. Thus when the rod 85 is pulled in one direction the screw member 62 is threaded in the plug or closure 18a in direction to move the plate 17 inwardly to increase the tension upon the spring 16, and when pushed in the opposite direction the screw member 62 is threaded in the plug direction to move the plate 17 outwardly and in direction to decrease the tension upon the spring 16. The plate 17 has the openings 61 therein so that the plate does not pull vacuum in adjustment as hereinabove described.

As shown in FIG. 4 a plug or closure 18b is shown in the end of the body 10 having no means other than the plug itself for adjusting the tension upon the first resilient means or spring 16, and in this view the hexagonal flange 25 has been turned to thread the threaded part 24 of the plug full up in the internally threaded end 86 of the body 10.

When a prime mover pulling a trailer is braked it happens ordinarily that the prime mover brakes will be applied more quickly than the trailer brakes which are more remotely located from the source of compressed air 42 than the prime mover brakes. Although the time interval between the arrival of the compressed air to apply the trailer brakes may be relatively infinitesimal in length of time after its arrival to apply the prime mover brakes, nevertheless during this time interval the trailer or drawn vehicle will be moving forward while the tractor or prime mover is stopped with the consequence that the trailer tends to shear the kingpin or means connecting it to the prime mover, also there occurs the disagreeable feature of the impact force transmitted to the forward vehicle.

When this invention is employed the tension of the larger or stronger first resilient means or spring 16 can be adjusted so that the valve element or plate 15 cannot be forced away from the shoulder 14 until the fluid pressure, as that of the braking air in the bore 11, attains a predetermined pressure above the static pressure of the fluid in the system when the brake pedal 39 is in normal, unapplied position. Before this predetermined pressure has been reached the compressed fluid has passed down the conduit 46 to arrive at and begin applying the trailer brakes 49, 49', and then when the predetermined pressure is attained, the valve element or plate 15 is moved to compress the first resilient means or spring 16 as the flange 27 of the valve or valve means 26 is firmly pressed by such fluid pressure into seated position against the valve element as abetted by the urging of the second resilient means or spring 31.

As the valve element or plate 15 is moved away from the shoulder 14 the compressed air may pass through the openings 59 therein the arms 58 to flow into the body counterbore 12 and from thence through the conduits 51 and 52 to actuate the prime mover brakes. A bore 60 is provided in the valve or valve means 26 which permits a small amount of the brake fluid, as compressed air, to enter the counterbore 12 in advance of the unseating of the valve element or plate 15 but not with sufficient speed or in sufficient quantity to apply the tractor or prime mover brakes, but only in amounts to increase the pressure within the counterbore 12 and downstream therefrom in degree to condition the system to open more readily upon the opening of the valve element or plate 15.

After the brakes have been applied to first brake the trailer or drawn vehicle wheels and then to build up pressure to open the valve element or plate 15 and apply the brakes of the prime mover or tractor vehicle wheels, the pressure may be relieved from the brake pedal 39 to let the fluid return toward the source or drop in pressure. Such pressure drop will naturally occur first in the bore 11 and conduits communicating therewith with the attendant result that the first resilient means or spring 16 can urge the valve element or plate 15 to seat again upon the shoulder 14. Thereafter the pressure differential between the fallen off pressure in the bore 11 and the pressure in the counterbore 12 will permit the fluid in the counterbore to urge against the cup 30 and the valve head or flange 27 and compress the second resilient means or spring 31 and open the valve or valve means 26 by unseating the flange 27 from the valve element or plate 15 to let the fluid flow out into the bore 11 tending to equalize the pressures on the opposite sides of the valve element.

Then finally, with the pressures substantially equalized, equalization may be maintained by virtue of the bore 60 in the valve 26 being able to pass fluid in either direction, dependent upon the occurrence of pressure drop or pressure increase in the bore 11, or dependent upon the occurrence of pressure drop or pressure increase in the counterbore 12.

As a feature of construction, the central opening or aperture 13 in the valve element or plate 15 has slots or extensions 90 from the periphery thereof in order to let the compressed air from the counterbore 12 pass more rapidly into the bore 11 in the course of equalization of pressures in such counterbore and bore. Optionally small holes may be drilled in the valve element or plate 15 for this purpose, such holes being spaced slightly outwardly from such central opening or aperture 13.

Having set forth the salient features of the operation of the invention, it can be seen that the broad spirit thereof has a multiple of applications other than in the braking of vehicles in tandem, and can be employed under any conditions whereby it may be desired to employ the force of a pressurized fluid at one place in point of time during the building up of the pressure and in advance of the employment of the force of the pressurized fluid at another point after it has been built up to a predetermined value. In particular it should be noted that the system as disclosed, does not have to operate normally at atmospheric pressure or be open to the atmosphere, but rather, and preferably, a closed system may be employed.

A preferred form of the invention is shown in FIGS. 6 and 7 in which the rod 91 to which the disc 17 bearing against the first resilient means or spring 16 is connected, has a transverse bore 92 through the outer end thereof to receive the turned down end 94 of the transverse arm 93 of an adjustment rod 95. From the arm 93 a longitudinally extending arm 96 at right angles thereto extends snugly slidably through a bore 97' in a guide boss 97 which protrudes from the valve body 10. The rod arm 96 extends further and snugly slidably through a bore 98' in an inner valve body lug 98 and in FIG. 6 is shown terminating just outwardly of such lug 98.

A wire 100, such as the type termed piano wire in the trade, which is flexible but of substantial rigidity, has an end thereof which extends into an axial bore in the end of the rod arm 96 to be held firmly therein by a set screw 102, which is threaded into a transverse tapped hole in the rod arm to bear firmly against the wire 100 while the set screw is of such a short length that when threaded full up in the hole to bind the wire 100, the head of the set screw does not extend outwardly of the periphery of the rod arm 96.

An extensible and contractable bellows tube or sheath 99, known scientifically as a Bowden tube, receives the wire 100 therethrough, and one end of the Bowden tube 99 is shown in FIG. 6 extending through a bore 101' in an outer valve body lug 101. A set screw 125 is threaded into an axially tapped bore in the lug 101 to bear upon the Bowden tube at this end to anchor it.

The Bowden tube 99 with the wire 100 therein, extends a spaced distance from the valve body 10 to a conveniently located, J-shaped adjustment bracket 103 which may be mounted to be accessible for adjustment such as on the chassis or in the driver compartment of the prime mover or truck which draws a trailer thereafter, as hereinabove described. The structure to which the adjustment bracket 103 is affixed is indicated by a structural angle 104 in FIG. 7.

A post 105 extends outwardly from the panel 106 of the bracket 103 and has a transverse bore 105' therethrough coaxial with the Bowden tube 99, to receive therethrough the end of the Bowden tube 99, which is to be anchored. A set screw 106' in an axially tapped hole through the outer end of the post 105 bears tightly against the Bowden tube within the post 105 to anchor it to the post.

The panel 106 of the adjustment bracket 103 pivotally mounts an adjustment lever 110 including a handle 113 and a lever arm 108 rigidly connected thereto. The details of such lever 110 and its mounting will be explained hereinbelow, while its function with relation to adjustably anchoring the Bowden wire 100 comprises providing a bore 107 in the lever arm 108 through which the wire 100 may extend to be tied in a knot 121 by means of its end or running length, whereby the operative length of the wire 100 comprises the length of wire between the knot 121 and the set screw 125 which anchors the other end of the wire 100 at the lug 101 of the valve body 10. After the wire 100 is anchored to the aforesaid lever arm 108, further adjustment can be effected as to position of the disc 17 in the counterbore 12 by use of the adjustment lever 110 which is mounted on the adjustment bracket 103 in the following manner.

The adjustment bracket panel 106 has a bore 122 therein and the head 111' of a pivot pin 111 bears upon the inner face of the panel 106 while the larger diameter, unthreaded portion 115 of the pivot pin shank passes through the bore 122 to extend through a spacer washer 112 immediately outwardly of the panel 106. The unthreaded shank portion 115 further extends through a bore provided through the rigidly connected handle 113 and lever arm 108, and the pin shank terminates in a reduced diameter, threaded end 123 onto which a lock nut 114 is threaded until its inner face abuts the outer face of the arm 108 in degree to latch the assembly together while permitting the lever 110 to be moved pivotally about the shank of the pin 111.

The adjustment bracket 103 includes a side part 117 at right angles to the panel 106, and a toe part 118 at right angles to the side part 117. As indicated in FIG. 7 the toe 118 and structural angle 104 are drilled at 119 to provide holes through which bolt connections may be made.

To make adjustments previous to operation, the set screw 106' is loosened in the post 105 and the wire 99 is moved through the post in direction to move the disc 17 to increase or decrease the tension on the first resilient means or spring 16, as the requirements of operation may require from time to time.

The outer end of the lever handle 113 is twisted at 90 degrees to provide a thumb rest 116 when the position of the lever 110 is to be changed, the piano wire 100 being of sufficient predetermined length to provide a range of adjustment in length, say ⅝ inch, the tension of the first resilient means or spring 16 being determined by the position of the disc 17 within the valve body. The upper and lower limits of adjustment of the lever 110 are determined by stop pins 120, 120' located respectively above and below the central part of the lever handle 113 as shown in FIG. 6, these stop pins being in vertical alignment upon the panel 106, and thus only the upper stop pin 120 may be seen in the plan view of FIG. 7.

In operation it has been found necessary to have substantial tension on the first resilient means or spring 16 when the trailer is loaded, so that brake air may have a longer time to be applied to the trailer brakes before application to the prime mover brakes to first brake this load of great momentum before the air passes through the valve body 10 against the force of the first resilient means or spring 16, to brake the prime mover.

On the other hand, when the trailer is empty or carries light load, the tension of the first resilient means or spring 16 should be reduced, for otherwise, with the same tension on the first resilient means or spring 16 as required to successfully pre-brake a loaded trailer, the empty or lightly loaded trailer will be braked too soon and too readily, and thereby there may be an instant in time wherein the prime mover or truck must drag along the braked trailer before the compressed air reaches the prime mover brakes to brake them.

The invention, in its wide scope of usages, is thus not limited to the particular structural embodiments shown in the drawings and hereinabove described but other embodiments, variations, and modifications are considered as well as such may fall within the broad spirit of the invention, and within the broad scope of interpretation claimed and merited for the appended claims.

What is claimed is:

1. A valve structure for directing a fluid into different channels at different times, said valve structure including a body having a bore therein and a counterbore therein communicating with said bore to form a shoulder, connection opening means from within said bore to a first location of pressure application, connection opening means from within said counterbore to a second location of pressure fluid application, a channel provided by said body and said bore to establish fluid communication between the source of the fluid and the connection means to said first location, a valve plate in said counterbore normally seated against said shoulder and having opening means substantially centrally therethrough and port means outwardly thereof, both opening means and port means being occluded when said valve plate is seated upon said shoulder and said port means are immediately fully uncovered when said valve plate is moved from said shoulder, a closure for said counterbore, a first resilient means between said valve plate and said closure urging said valve plate seated against said shoulder, valve means including a flange normally to bear guideably within said bore and a stem extending from said flange through said opening means into said counterbore and providing therein an outwardly extending bearing surface, a bleed passage of uniform cross-section being provided through said stem and flange as the only passage space through said valve means, said opening means including space outwardly from said stem but short of said port means and of the outer diameter of said flange to be occluded by said flange when said flange is seated on said valve plate on the bore side thereof and immediately fully uncovered when said flange and said plate move apart, a second resilient means of lesser force than said first resilient means surrounding said stem with inner end bearing on said bearing surface and outer end bearing on the counterbore side of said valve plate to urge said flange seated on said valve plate, said valve structure thereby operating so that when pressurized fluid is supplied from a source to said channel it first flows through said channel and builds up a pressure to unseat said valve plate while at the same time urging said flange tightly against said valve plate, said pressure fluid then flowing through said valve plate openings and into said counterbore and therefrom through said counterbore connection means to said second location, said valve plate re-seating as fluid pressure in said bore and said counterbore equalizes, and upon release of fluid pressure at said source the pressure of fluid in said counterbore forcing said valve flange unseated to again equalize bore and counterbore pressures, said closure including means associated therewith for movement for adjusting the tension in said first resilient means.

2. A valve structure as claimed in claim 1 in which said closure associated means extends guideably and seatably through said closure to bear sealably against said first resilient means, said closure associated means being adjustable by the application of an axially directed force outwardly of said valve body to change the tension of said first resilient means.

3. A valve structure as claimed in claim 1 in which said closure associated means includes means extending threadably and sealably through said closure to bear inwardly against said first resilient means, said closure associated means also including means connected to said threadably and sealably extending closure associated means which is operable by the application of a rotative force outwardly of said valve body to change the tension of said first resilient means.

4. A valve structure as claimed in claim 1 in which said closure is threadable into said body and in which the closure associated means comprises the closure threads which turn in the body threads to move said closure inwardly and outwardly to change the tension of said first resilient means.

5. A valve structure as claimed in claim 1 in which said closure associated means includes a second stem extending guideably and sealably through said closure and an adjustment guide rod parallel thereto and guided by guide means provided by said body to be moved axially whereby to direct axial movement of said second stem to change the tension of said first resilient means.

6. A valve structure as claimed in claim 1 in which said closure associated means includes adjustment means to bear inwardly upon said first resilient means and extending axially guideably sealably through said closure, a guide rod connected thereto to extend parallel therewith through protuberance means provided by said valve body, an adjustment bracket mounted for operator access, and adjustment lever pivotally mounted on said bracket, a flexible wire connected axially at one end to said guide rod and at the other end adjustably connected to said lever, a bellows sheath surrounding said wire and anchored at one end to said protuberance means and at the other end to said bracket, whereby adjustment of the length of wire between guide rod and point of lever anchorage regulates the tension of said first resilient means.

7. A valve structure including a body having an axially aligned bore and counterbore forming a shoulder, conduit means from said bore and counterbore, respectively, to a first and a second location of pressure fluid application, a channel, including said bore, from a source of pressure fluid to said first location, a closure for the outer end of said counterbore, a valve assembly included by said valve structure and comprising, a valve plate with outer face to seat against said shoulder, said plate providing an aperture centrally therethrough, a first, relatively strong, resilient means yieldably urging between the inner face of said plate and said closure, said valve assembly also including a valve means including a flange in said bore to bear upon said plate outer face and including a stem extending guideably, slidably, with slight clearance through said aperture into said counterbore and carrying a transverse member to provide a bearing surface, a second, weaker resilient means yieldably urging between the inner face of said plate and said transverse member, said valve assembly also providing pressure equalization passage means therethrough in addition to said aperture, whereby applied pressure fluid from said source through said channel into said bore acts at said first location and in said bore against said flange urging it against said plate and unseating said plate to flow into said counterbore and through said respective conduit means to said second location as said plate and flange are separated by the pressure differential between said resilient means, said plate then re-seating upon said shoulder as bore and counterbore pressures equalize, with equalization including the passage of counterbore pressure fluid through said equalization passage means, and, upon release of fluid pressure at said source, the bore and counterbore pressures again equalizing as said flange first unseats from, and then re-seats upon said plate as counterbore pressure fluid passes back through said equalizing passage means, said closure including means associated therewith for movement to adjust said first resilient means tension, and said closure associated means including adjustment means to bear inwardly upon said first resilient means and extending axially guideably sealably through said closure, a guide rod connected thereto to extend parallel therewith through protuberance means provided by said valve body, and adjustment bracket mounted for operator access, an adjustment lever pivotally mounted on said bracket, a flexible wire connected axially at one end to said guide rod and at the other end adjustably connected to said lever, a bellows sheath surrounding said wire and anchored at one end to said protuberance means and at the other end to said bracket, whereby adjustment of the length of wire between guide rod and point of lever anchorage regulates the tension of said first resilient means.

References Cited by the Examiner

UNITED STATES PATENTS

| | | | |
|---|---|---|---|
| 1,177,011 | 3/16 | Brunskill | 137—543.21 |
| 1,840,968 | 1/32 | Miller | 137—530 |
| 1,841,354 | 1/32 | Bowen | 137—493.4 |
| 2,161,642 | 6/39 | Stroup | 137—493.4 |
| 2,302,158 | 11/42 | Van Vulpen | 251—294 XR |
| 2,509,958 | 5/50 | Burn | 137—493.6 |
| 2,964,310 | 12/60 | Stahlhuth | 267—1 |

M. CARY NELSON, *Primary Examiner.*

MARTIN P. SCHWADRON, *Examiner.*